3,663,563
ESTERS OF 6-AMINOPENICILLANIC ACID

George Robert Fosker, Horsham, Sussex, and John Herbert Charles Nayler, Dorking, Surrey, England, assignors to Beecham Group Limited, Brentford, England
No Drawing. Filed July 22, 1969, Ser. No. 843,744
Claims priority, application Great Britain, July 26, 1968, 35,771/68; Feb. 13, 1969, 7,757/69
Int. Cl. C07d 99/14
U.S. Cl. 260—306.7          6 Claims

ABSTRACT OF THE DISCLOSURE

Esters of 6-aminopenicillanic and are disclosed. These have utility as intermediates in the preparation of semi-synthetic penicillins.

---

This invention relates to chemical intermediates and is particularly concerned with a novel class of esters of 6-aminopenicillanic acid which are of value as intermediates in the preparation of penicillins.

According to the present invention there is provided compounds of the general formula:

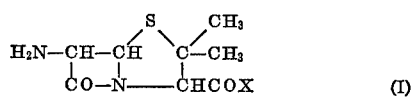
(I)

wherein X is a 2,2,2-trihalogenoethoxy, aryloxy, substituted aryloxy, alkylthio, aralkylthio or arylthio group, or the group —O—N=CHR where R is an alkyl, aryl or heterocyclic group, and their acid addition salts. The salts of compounds of the general Formula I may be derived from either inorganic or organic acids, for example hydrochloric acid or benzenesulphonic acid.

The compounds of the present invention are prepared from the corresponding esters of benzylpenicillin or other penicillins prepared by fermentation, such penicillin esters being either known compounds or compounds readily prepared by known methods.

The present invention also provides a process for the preparation of the compounds (I), which process comprises treating a penicillin ester of the general formula:

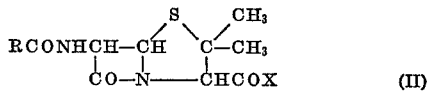
(II)

where R is an organic radical and X is as hereinbefore defined, in an inert anhydrous organic solvent with a tertiary base and an inorganic acid halide to form an halogen derivative of the general formula:

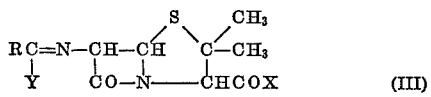
(III)

where Y is a halogen atom, adding thereto a lower alkanol to form a compound of the general formula:

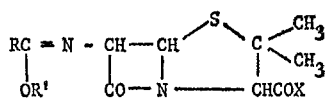

where R' is a lower alkyl group and thereafter hydrolysing.

Preferably the inert anhydrous organic solvent in which the penicillin ester (II) is dissolved in a chlorinated hydrocarbon. A particularly suitable tertiary base is N-methylmorpholine and a particularly suitable inorganic acid halide is phosphorus pentachloride which may be pre-dissolved in the solvent.

The final hydrolysis step to produce the desired ester of 6-aminopenicillanic acid (I) is effected by the addition of water to the mixture containing the alkoxy compound (IV), the ester (I) remaining in the solvent phase from which it is isolated. The ester is conveniently isolated by separating the phases and treating the washed and dried solvent phase with a solution of benzenesulphonic acid in an organic solvent or mixture of solvents such as acetone/ether. This treatment causes precipitation of the benzenesulphonate salt of (I) which is collected by filtration, often in analytically pure crystalline form.

Complete cleavage of the acyl side-chain from the penicillin ester (II) can be verified conveniently by examining the I.R. spectrum of the product (I) or the solvent phase containing it, whereby the typical secondary amide absorption band at about 1680 cm.$^{-1}$ can be seen to have disappeared. Yields of (I) are usually excellent.

The novel esters (I) are useful in that they can be acylated by standard methods to give esters of semi-synthetic penicillins. The latter, either with or without isolation, may then be subjected to mild alkaline hydrolysis to form a therapeutically useful semi-synthetic penicillin.

The group X has been specially selected so as to permit hydrolysis under conditions which the sensitive β-lactam ring will withstand, whilst being sufficiently robust to permit (II) and (I) to be handled without difficulty. While some other esters of 6-aminopenicillanic acid are known they do not in general meet the above requirements.

The process of the present invention permits the conversion of the readily available benzylpenicillin into an ester of 6-aminopenicillanic acid (I), and subsequently into a semi-synthetic penicillin, in normal chemical apparatus without the use of enzymes. A further advantage is that both the ester and the derived semi-synthetic penicillin is free from contamination by allergenic protein.

EXAMPLE 1

2,2,2-trichloroethyl 6-aminopenicillanatebenzenesulphonic acid salt 2,2,2-trichloroethyl benzylpenicillinate (1.16 g.), was dissolved in dry carbon tetrachloride (25 ml.), the colourless solution was chilled to —25° C., and to it was added N-methylmorpholine (0.56 ml.) immediately followed by a solution of phosphorus pentachloride (0.6 g.) in dry carbon tetrachloride (15 ml.) over 5 minutes with continuous stirring. After further stirring for 30 minutes with the temperature slowly rising, but not allowed above 0°, a pale yellow colour slowly developed. The mixture was recooled to —25° C. and dry methanol (20 ml.) together with a further quantity of N-metyl morpholine (0.56 ml.) were added with steady rise in temperature. With the temperature at —5° C., the reaction mixture was stirred for 2 hours, then water (40 ml.) was added with vigorous stirring. The pH was quickly readjusted from 1.2 to 6.0 with dilute sodium hydroxide solution. The two phases were separated, the organic one was washed with water, followed by saturated brine solution (50 ml.). It was then treated with a solution of benzene sulphonic acid monohydrate (0.44 g.) in acetone and dry ether (50 ml.). The solution was allowed to stand when a fine white crystalline precipitate was obtained. After standing at 0° for 1 hour, the suspension was filtered and the solid was washed with cold dry ether and finally dried in vacuo to give 2,2,2-trichloroethyl 6-aminopenicillanate benzenesulphonic acid salt (1.05 g., 82%) M.P. 161° (d): (Found C, 38.0; H, 3.9; Cl, 21.1; N, 5.4; S, 12.4. $C_{16}H_{19}Cl_3N_2O_6S_2$ requires C, 38.0; H, 3.8; Cl, 21.0; N, 5.5; S, 12.7%.). The well resolved infra red spectrum revealed the β-lactam carbonyl at 1787 cm.$^{-1}$ and the ester carbonyl at 1760 cm.$^{-1}$. The secondary amide carbonyl band present in the starting material at 1680 cm.$^{-1}$ was completely absent in the product. Paper chromatography in butanol/ethanol/water showed no zone of antibiotic inhibition until the chromatogram was sprayed with phenylacetyl chloride, when a zone appeared with an $R_f$ value of 0.9.

The starting 2,2,2-trichloroethyl benzylpenicillinate, M.P. 157–159° C., was prepared by the action of 2,2,2-trichloro ethanol on benzylpenicillin ethoxyformic anhydride, itself prepared in situ from benzylpenicillin sodium salt and ethylchloroformate in dry acetone containing a drop of pyridine as catalyst.

EXAMPLE 2

Phenyl 6-aminopenicillanate benzenesulphonic acid salt

This compound (0.87 g., 90%) was prepared as described in Example 1 when 2,2,2-trichloroethyl benzylpenicillinate was replaced by phenyl benzylpenicillinate (1.02 g.) in methylene dichloride (25 ml.), except that it failed to crystallise and was isolated by concentrating the organic phase under reduced pressure and precipitating the product with dry ether. The infra red spectrum of the material had the β-lactam carbonyl at 1785 cm.$^{-1}$ and the ester carbonyl at 1755 cm.$^{-1}$. The secondary amide carbonyl band present in the starting ester at 1680 cm.$^{-1}$ was no longer present. Paper chromatography indicated no zone of inhibition until the chromatograph was sprayed with phenylacetyl chloride, when the $R_f$ value was 0.81.

EXAMPLE 3 p-Chlorophenylthio 6-aminopenicillinate benzenesulphonic acid salt p-Chlorophenylthio benzylpenicillinate (4.6 g.) was dissolved in dry carbon tetrachloride (75 ml.), the colourless solution was chilled to —25° C. and to it was added N-metyl morpholine (2.25 ml.) immediately followed by a solution of phosphorus pentachloride (2.4 g.) in dry carbon tetrachloride (30 ml.) over 5 minutes with continuous stirring. After stirring for 30 minutes with the temperature slowly rising, but not allowed above 0° C., a pale yellow colour slowly developed. The mixture was re-cooled to —25° C. and a solution of N-methyl morpholine (2.25 ml.) in absolute methanol (80 ml.) added over 5 minutes. With the temperature held at 0° C. the mixture was stirred for 1 hour, and then for a further hour without external cooling. Water (250 ml.) was added with vigorous mixing, the pH was quickly readjusted from 1.7 to 6.0 with dilute sodium hydroxide solution, and the two phases were separated. The organic one was washed with water (50 ml.) followed by saturated brine solution (2× 100 ml.), and then treated with a solution of benzene sulphonic acid monohydrate (1.76 g.) in acetone (5 ml.). Minute crystal clusters soon began to separate, and after standing for 1 hour at room temperature the thick white suspension was filtered. The solid was washed with dry ether and finally dried in vacuo to give p-chlorophenylthio 6-aminopenicillinate benzenesulphonic acid salt (3.97 g., 80%), M.P. 168° (d). (Found (percent): C, 47.9; H, 4.2; Cl, 7.3; N, 5.2; S, 19.2. $C_{20}H_{21}ClN_2O_5S_3$ requires (percent): C, 47.9; H, 4.2; Cl, 7.1; N, 5.6; S, 19.2.) The well resolved infra-red spectrum revealed the β-lactam carbonyl at 1800 cm.$^{-1}$ and the ester carbonyl at 1695 cm.$^{-1}$. The secondary amide carbonyl band present in the starting penicillin ester at 1655 cm.$^{-1}$ was completely absent in the product. Paper chromatography in butanol/ethanol/water showed no zone of antibiotic inhibition untl the chromatogram was sprayed with phenylacetyl chloride, when a zone appeared with an $R_f$ value of 0.84.

The starting p-chlorophenylthio benzylpenicillinate, M.P. 140–142°, was prepared by the action of p-chlorothiophenol on benzylpenicillin ethoxyformic anhydride.

EXAMPLE 4

Phenyl 6-aminopenicillanate p-toluenesulphonic acid salt

Phenyl benzylpenicillinate (5.1 g.) was dissolved in methylene dichloride (125 ml.), the colourless solution was chilled to —25°, and to it was added with continuous stirring N-methylmorpholine (2.8 ml.) immediately followed by a solution of phosphorus pentachloride (3.0 g.) in dry carbon tetrachloride (50 ml.) over 5 minutes. The addition was accompanied by a slight rise in temperature of about 5°. Stirring was continued for 30 minues further with the temperature slowly rising, but not allowed above —5°. The reaction was then re-cooled to —25° and a solution of N-methyl morpholine (2.8 ml.) in absolute methanol (100 ml.) was added over 5 minutes with a steady rise in temperature to —5° C. Stirring was continued for 1 hour at —5° and then for 1 hour further without external cooling. The reaction mixture was poured into water (200 ml.) and the pH quickly readjusted from 2 to 6.0 with dilute sodium hydroxide solution. The two phases were separated, the organic one was washed with water (100 ml.) followed by saturated brine solution (2× 100 ml.), and then treated with a solution of p-toluenesulphonic acid monohydrate (2.4 g.) in acetone (25 ml.). Dry ether (500 ml.) was added slowly when a fine white crystalline material slowly deposited. After standing at 0° for 16 hours the solid was filtered to give the 6-aminopenicillanic acid ester salt, (4.4 g., 79%) M.P. 147–148(d). After recrystallisation from ethyl acetate-ethanol-ether a sample, (M.P. 149–151°) (d). (Found (percent): C, 53.9; H, 5.2; N, 6.0; S, 13.8. $C_{21}H_{24}O_6N_2S_2$ requires (percent): C, 54.3; H, 5.2; N, 6.0; S, 13.8 was obtained.) The infra red spectrum revealed the β-lactam carbonyl at 1789 cm.$^{-1}$ and the ester carbonyl at 1732 cm.$^{-1}$. The secondary amide carbonyl band present in the starting penicillin ester at 1695 cm.$^{-1}$ was completely absent in the product. Paper chromatography in butanol/ethanol/water showed no zone of antibiotic inhibition until the chromatogram was sprayed with phenylacetyl chloride when a zone appeared with an $R_f$ value of 0.81.

EXAMPLE 5

N-(6-aminopenicillanoyloxy)benzylidene imine benzenesulphonate

N - (6 - phenylacetamidopencillanyloxy)benzylidene imine (8.75 g.) was dissolved in dry carbon tetrachloride (100 ml.), the colourless solution chilled to —25° C., and to it was added N-methyl morpholine (45 ml.) immediately followed by a solution of phosphorus pentachloride (4.8 g.) in dry carbon tetrachloride (80 ml.) over 10 minutes with continuous stirring. After further stirring for 30 minutes with the temperature slowly rising, but not allowed above 0° C., a pale yellow colour slowly developed. The mixture was re-cooled to —25° C. and a solution of N methyl morpholine (4.5 ml.) in dry methanol (160 ml.) was added with a steady rise in temperature to —5° C. The reaction mixture was stirred for two hours at 0°, when water (300 ml.) was added with vigorous stirring and the pH readjusted from 1.1 to 6.4 with dilute sodium hydroxide solution. The combined organic phases were then washed with water (100 ml.) followed by saturated brine solution (2× 250 ml.) and then treated with a solution of benzenesulphonic acid monohydrate (3.5 g.) in acetone (25 ml.). Dry ether was added until a faint turbidity persisted and allowed to stand overnight. The resultant solid (8.7 g.) was re-suspended in acetone:ethylacetate mixture, filtered, washed with dry ether and finally dried in vacuo to give the benzenesulphonic acid salt (2.4 g.), M.P. 148–149° C. (d). (Found (percent): C, 52.5; H, 4.9; N, 8.4; S, 13.5. $C_{21}H_{23}N_3O_6S_2$ requires (percent): C, 52.8; H, 4.9; N, 8.8; O, 20.1; S, 13.4.)

The I.R. spectrum revealed the β-lactam carbonyl at 1790 cm.$^{-1}$, the "ester" carbonyl at 1770 cm.$^{-1}$ and the complete absence of the secondary amide carbonyl present in the starting material at 1675 cm.$^{-1}$. Paper chromatography in butanol:ethanol:water showed no zone of antibiotic inhibition until the chromatogram was sprayed with phenylacetyl chloride, when a zone appeared with an $R_f$ value of 0.84.

EXAMPLE 6

N-(6-aminopenicillanoyloxy)benzylidene imine p-toluene suphonate

N - (6 - phenylacetamidopenicillanoyloxy)benzylidene imine (4.37 g., 0.01 mol) dissolved in methylene chloride (50 ml.) was cooled to −20° C. and N-methyl morpholine (2.24 ml.) added. The stirred solution was treated with a solution of phosphorus pentachloride (2.4 g.) in methylene chloride (40 ml.) during 5 minutes and stirring continued at −20° C. for ½ hour. The reaction mixture was treated with N-methyl morpholine (2.24 ml.) followed by methanol (80 ml.) and stirred at 0° C. for 2¼ hours. The clear solution was mixed with water (150 ml.) and adjusted to pH 6.4 with N sodium hydroxide solution. The aqueous phase was separated and extracted with methylene chloride (55 ml.). The combined methylene chloride extracts were dried over anhydrous magnesium sulphate and treated with a solution of p-toluene sulphonic acid (1.9 g., 0.01 mol.) in dry acetone (10 ml.). The clear solution was evaporated under reduced temperature and pressure and the residue diluted with ethylacetate (2 vols.). On standing and scratching the product 3.05 g. (62.1%) was obtained as a colourless crystalline solid, M.P. 153° C. (d.) (Found (percent): C, 53.20; H, 5.08; N, 8.25; S, 13.08. $C_{22}H_{25}O_6N_3S_2$ requires (percent): C, 53.75; H, 5.12; N, 8.55; S, 13.05.)

The I.R. spectrum revealed the β-lactam carbonyl at 1780 cm.$^{-1}$ the "ester" carbonyl at 1760 cm.$^{-1}$ and the complete absence of the secondary amide carbonyl present in the starting material at 167 cm.$^{-1}$. Paper chromatography in butanol: ethanol:water showed no zone antibiotic inhibition until the chromatogram was sprayed with phenylacetyl chloride, when a zone appeared with an $R_f$ value of 0.91.

EXAMPLE 7

N-(6-aminopenicillanoyloxy)2-furfurylidene imine benzenesulphonate

N - (6 - phenylacetamidopenicillanoyloxy)-2-furfurylidene imine (4.27 g., 0.01 mol.) was reacted as described in Example 2. After reaction, the dried methylene chloride solution was treated with a solution of benzene sulphonic acid (1.76 g., 0.01 mol.) in dry acetone (10 ml.), diluted with dry ether to the faintest cloudiness and allowed to crystallise. The solid product was filtered off, washed with dry ether and dried in vacuo to give 1.88 g. (40%) of a pale buff coloured crystalline solid, M.P. 149–150° C. (d). (Found (percent): C, 48.35; H, 4.48; N, 8.55; S, 13.58. $C_{19}H_{21}O_7N_3S_2$ requires (percent): C, 48.81; H, 4.53; N, 8.99; S, 13.72.)

I.R. β-lactam: 1780 cm.$^{-1}$
"ester" CO: 1760 cm.$^{-1}$
Secondary amide at 1695 cm.$^{-1}$
$R_f$: 0.82

We claim:
1. A compound of the formula:

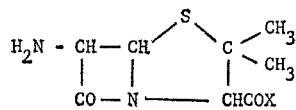

wherein X is the group —O—N=CHR where R is lower alkyl, phenyl or furfuryl, or an acid addition salt thereof.

2. N-(6-aminopenicillanoyloxy)benzylidene imine benzenesulphonate.

3. N - (6 - aminopenicillanoyloxy)benzylidene imine p-toluenesulphonate.

4. N-(6-aminopenicillanoyloxy) 2-furfurylidene imine benzenesulphonate.

5. N-(6-aminopenicillanoyloxy)benzylidene imine or an acid addition salt thereof.

6. N-(6 - aminopenicillanoyloxy)2-furfurylidene imine or an acid addition salt thereof.

References Cited

UNITED STATES PATENTS 3,399,207    8/1968    Bamberg et al. _____ 260—239.1

NICHOLAS S. RIZZO, Primary Examiner

U.S. Cl. X.R.

260—239.1; 424—271